(12) United States Patent
Lochbaum et al.

(10) Patent No.: US 12,304,810 B2
(45) Date of Patent: May 20, 2025

(54) GAS GENERATOR

(71) Applicant: Sensirion AG, Stäfa (CH)

(72) Inventors: Alexander Lochbaum, Meilen (CH); Ueli Schoen, Zürich (CH); Stefan Knobelspies, Zürich (CH); Jens Hornung, Richterswil (CH); Matthias Streiff, Zürich (CH); Ulrich Bartsch, Uetikon am See (CH)

(73) Assignee: Sensirion AG, Stafa (CH)

( * ) Notice: Subject to any disclaimer, the term of this patent is extended or adjusted under 35 U.S.C. 154(b) by 587 days.

(21) Appl. No.: 17/749,144

(22) Filed: May 20, 2022

(65) Prior Publication Data
US 2022/0371888 A1 Nov. 24, 2022

(30) Foreign Application Priority Data
May 21, 2021 (EP) ..................................... 21175334

(51) Int. Cl.
*C01B 13/02* (2006.01)
(52) U.S. Cl.
CPC ...... *C01B 13/0211* (2013.01); *C01B 13/0255* (2013.01)
(58) Field of Classification Search
None
See application file for complete search history.

(56) References Cited

U.S. PATENT DOCUMENTS

| | | | | |
|---|---|---|---|---|
| 3,862,866 A * | 1/1975 | Timmerman | ......... | B60R 21/264 |
| | | | | 149/113 |
| 5,423,384 A * | 6/1995 | Galbraith | ................. | C06D 5/06 |
| | | | | 169/84 |
| 6,096,286 A | 8/2000 | Autenrieth | | |
| 9,921,588 B2 | 3/2018 | Hornung et al. | | |
| 2004/0231770 A1 * | 11/2004 | Bley | ........................ | C06D 5/10 |
| | | | | 149/46 |
| 2009/0311165 A1 | 12/2009 | Podgorney | | |
| 2012/0125493 A1 * | 5/2012 | Pile | ......................... | C06B 43/00 |
| | | | | 149/23 |

FOREIGN PATENT DOCUMENTS

| | | |
|---|---|---|
| CN | 103509715 A | 1/2014 |
| DE | 3243012 A1 | 5/1984 |
| EP | 2077311 A1 | 7/2009 |
| EP | 1539300 B1 | 7/2010 |

(Continued)

OTHER PUBLICATIONS

Molecular Products Ltd; EO2-30 Chemical oxygen generator providing 3000 litres of breathable oxygen; LB01-00283 issue 2; 2021.

(Continued)

*Primary Examiner* — Aileen B Felton
(74) *Attorney, Agent, or Firm* — Renner, Otto, Boisselle & Sklar, LLP

(57) ABSTRACT

A gas generator comprises a compartment confined by a casing configured to hold an active material generating a target gas in response to thermal activation, and a heater structure configured and arranged to heat the active material for generating the target gas. The heater structure is arranged outside the compartment and heats the active material from at least two sides.

20 Claims, 2 Drawing Sheets

(56) References Cited

FOREIGN PATENT DOCUMENTS

| EP | 1404156 A2 | 3/2014 |
| EP | 3367087 A2 | 8/2018 |
| EP | 3502687 A1 | 6/2019 |
| JP | H02204307 A | 8/1990 |
| JP | H05119004 A | 1/1999 |
| JP | 2019189474 A | 10/2019 |
| WO | 2019185181 A1 | 10/2019 |

OTHER PUBLICATIONS

HSG-IMIT Abschlussbereicht—Kurzfassung : PhyGas Integriertes Sensorsystem zur physikalischen Gasanalyse, Kurt Kilche, Jul. 12, 2011, HSG-IMIT, Wilhelm-Schickard-Strasse 10, D-78052 Villingen-Schwenningen and partial English machine translation.

Kliche, et al. "Sensor for gas analysis based on thermal conductivity, specific heat capacity and thermal diffusivity", MEMS 2011, Cancun, 978-1-4244-9634-1 IEEE p. 1189-1192.

Kliche, et al. "Sensor system for thermal gas analysis", Mikrosystemtechnik Kongress 2011, ISBN 978-3-8007-3367-5, VDE Verlag Berlin, p. 875-878 and English abstract.

* cited by examiner

GAS GENERATOR

This application claims priority of European Patent Application No. 21175334.8 filed May 21, 2021, which is hereby incorporated herein by reference in its entirety.

TECHNICAL FIELD

The invention refers to a gas generator.

BACKGROUND ART

Chemical oxygen generators (COGs) are well-known in the prior art. They are commonly used in mines, airplanes, submarines, etc. to supply breathing oxygen in non-breathable atmospheres.

A chemical oxygen generator relies on a thermal decomposition of peroxides or chlorates, during which oxygen is released. In COGs, the necessary energy to sustain this reaction is often supplied by a secondary exothermic chemical reaction, e.g., the reaction of iron particles with the peroxide or the generated oxygen. This enables a sustained reaction after the COG is initially started, leading to a complete consumption of the oxygen geration capacity of the COG which can not be stopped after its start.

DE 32 43 012 A1 refers to such a COG. A zinc peroxide is prepared by reaction of an ammonia solution of zinc salts with H2O2. By way of this method a zinc peroxide having at most 14% active oxygen is obtained. This oxygen is liberated either by heating the zinc peroxide or by reaction with acids or acid compounds, obtaining as intermediate stage hydrogen peroxide which is decomposed already in situ. The thermal decomposition can be effected either by external feeding of heat or by reacting the zinc peroxide with powdered metals which are mixed in the zinc peroxide. In this embodiment, the mixture of zinc peroxide and powdered metal needs to be ignited only at one point; once the reaction has been initiated, it then continues by itself. In the case of the decomposition of the zinc peroxide by acids or acid compounds, a decomposition catalyst for hydrogen peroxide is preferably mixed in the zinc peroxide.

Such COG is not suited for generating low volumes of a target gas, such as oxygen, over a long period in time on-demand.

DISCLOSURE OF THE INVENTION

The problem to be solved by the present invention is therefore to provide a gas generator overcoming the drawbacks in the art.

This problem is solved by a gas generator according to claim 1. The gas generator comprises a compartment that is confined by a casing. The casing holds an active material in the compartment. The active material is active in a sense that a target gas is generated in response to thermal activation of the active material. For this purpose, a heater structure is provided to heat the active material for generating the target gas. Accordingly, the heater structure is thermally coupled to the active material. In addition, the heater structure is arranged outside the compartment. Given that the compartment is defined as volume confined by the casing, providing the heater structure outside the compartment includes providing the heater structure outside the casing or providing the heater structure within the casing material. In a preferred embodiment, the heater structure encloses the active material, or, in other words, the active material is arranged within the heating structure. In any case, the heater structure is not fully immersed in the active material.

Further, the heater structure is arranged to heat the active material from at least two sides. With respect to the direction of heating the active material, a side shall be defined as a side of the virtual cuboid/box enclosing the compartment. Along this definition, a compartment of arbitrary shape can theoretically be heated from six sides, i.e. the base side, the top side, and four lateral sides, following the Cartesian coordinate system. Preferably, the active material is heated from at least two sides, in particular from at least two of the lateral sides, and in particular from two opposite sides, especially from two opposite of the lateral sides, more preferably from four sides, in particular from the four lateral sides. In case the heater structure is arranged to enclose the active material as indicated above, the heater structure is arranged to heat the active material from four sides, especially from the four lateral sides.

Such arrangement of the heater structure enhances the uniformity of the active material being heated in the compartment. A uniform heating in turn reduces efforts in the control of the heater/the gas generator and as such allows to control the gas generator by means of a rather simple control mechanism. In addition, the uniform heating improves safety of the gas generator since lower maximum heater temperatures can be employed which significantly reduces the risk of thermal runaways.

The heater structure preferably is an electrical heater, in particular a resistive electrical heater that generates heat by way of applying an electrical current to the conducting electrical heater structure. This in particular enables the gas generator to release small portions of the target gas on-demand, i.e. whenever needed, in response to a short trigger pulse applied to the heater structure, for example. Using a resistive heater is very preferred over ignition in conventional COGs which lead to a self-sustaining reaction with the result that the oxygen generation process cannot be stopped or controlled once the device has been ignited. Hence, by using a resistive heater, local temperature peaks in the active material can be avoided otherwise leading to a non-controllable self-sustaining reaction. The resistive heater may, for example, not even be arranged outside the compartment to heat the active material from two sides, but instead be arranged inside the compartment, which explicitly shall be disclosed as alternative to the outside arrangement. For avoiding temperature peaks, it is preferred that the heating pulse or pattern is dimensioned such that a temperature evoked by the heating is less than the critical temperature for the target gas, in order to avoid a self-sustaining reaction. In one embodiment, pulse duration and pulse magnitude are preferably set to prevent a self-sustaining reaction in generating the target gas, i.e. the target gas generation stops at the end of the heating pulse. This is preferably the case when the heating pulse or pattern is dimensioned such that the critical temperature for the target gas is not reached. The target gas generation being controllable in a more precise manner in turn allows the gas generator to operate over an extended period in time such as one or more years, preferably five years or even longer.

The heater structure may be embodied as e.g. a wire coil heater, a wire meander heater, in a flexible or non-flexible printed circuit board, as a printed ceramic heater, etc. In particular the wire coil embodiment is preferred due to its simplicity and its good manufacturability. When current is applied to the heater structure, the active material is thermally activated and decomposes under the generation of the target gas.

Preferably, the heater structure is out of contact with the active material. Because the active material is not in direct contact with the heater structure, corrosion effects of the active material acting on the heater structure can be avoided. In particular, in case the heater structure is a resistive heater including metal, corrosion of the heater structure can be prevented. The active material can be packaged into the casing, while the heater only has contact to the material of the capsule, i.e. the casing. This reduces the risk of chemical degradation of the heater structure and/or contamination of the active material in contrast to central heater structures. Hence, the present gas generator is more robust.

In one embodiment, the casing defining the compartment serves as a physical separation of the active material from the heater structure. Accordingly, an outer side of the casing faces the heater structure, while an inner side of the casing faces the active material. In order to efficiently heat the active material through the casing, the casing preferably is made from a thermally conducting material, preferably from metal or from a polymer having a high thermal conductivity. In one embodiment, the heater structure, or at least parts of it, is/are in contact with the casing, e.g. a wire may be wrapped around the casing. This facilitates an excellent heat flow from the heater structure to the casing.

In a different embodiment, the heater structure is integrated in the casing. In such embodiment, the heater structure may be cast into the casing during manufacturing of the casing. The resulting casing, in particular its shell as defined later on, holds the heater structure integrally, i.e. the heater structure cannot be removed from the shell without destroying the heater structure and/or the shell. In particular, in one way of manufacture, a mold may be provided in form of the designated compartment. A wire coil may be wrapped around the mold, and in a subsequent step, the mold with the wire coil/heater structure is molded such that a casing, and in particular a shell of the casing, is manufactured where the heater structure and the shell are inseparably joined. In such embodiment, portions of the heater structure may be in contact with the active material later on, given that the wire coil is directly wrapped onto the mold during manufacturing. However, such arrangement still is way less prone to corrosion effects compared to conventional central heaters.

The casing, or at least a part of such as a shell introduced later on preferably is made from an inert material, such as a passivated metal. As an example, the active material may be packaged in a passivated metal shell, e.g., a Ni-plated brass, which shell represents a portion of the casing, in particular the portion of a cylindrical casing which confines a cylindrical compartment.

More general, the compartment may have a longitudinal extension along a longitudinal axis, and a shell represents the portion of the casing along the longitudinal axis. In such embodiment, it is preferred that the heater structure is arranged outside of or integrated in the shell of the casing, while other parts of the casing are not covered or nerved by the heater structure. Accordingly, all above statements with respect to the arrangement of the heater structure may in particular be read on the shell instead of the casing as a whole. I.e. in case of the shell supporting the heater structure, the compartment preferably is enclosed along its longitudinal axis by the heater structure in order to provide for a homogeneous temperature distribution. Hence, the active material in the compartment is heated from four sides.

In the above embodiment with a casing comprising a shell, and in particular with the compartment being of cylindrical shape, the casing may be defined by a base plate and a cap arranged on and attached to the base plate. The cap comprises the shell and a front end opposite the base plate.

In an embodiment, a Cu heater coil including electrical insulation is wound on the shell, and thus has no direct contact with the oxidizing active material, e.g., ZnO2.

In a different embodiment, a foil supporting the heater structure is wrapped around the shell, and may be attached to the shell, e.g. by way of a glue.

In particular, a shape of the compartment is one of a polyhedron, a cylinder, a cone or a sphere. All these shapes of compartments and corresponding casings improve a homogeneous heating of the active material when the heater structure is applied to the outer surface/s of the casing.

In a preferred embodiment, the casing or at least its shell is made from a polymer, such as PEI or LCP, which allows for a water-tight connection with the base plate or socket. This in turn makes the gas generator washable, which can be important for applications requiring high cleanliness. In a different embodiment the casing or shell is made from a metal, e.g. from CuZn, Al, or from stainless steel, which materials have a high thermal conductivity, which enables a better temperature homogeneity in the active material when compared to a polymer shell. However, a metal-polymer interface between the metal casing and a polymer socket is more difficult to seal against water entry during washing.

Preferably, the compartment is small in size, i.e. preferably has a volume of less than 0.5 cm3, in particular in combination with the active material being zinc peroxide to generate O2 from. Accordingly, the gas generator can be considered as a micro gas generator.

Given that the active material is decomposed in response to the application of heat thereby releasing the target gas as desired, it is preferred that a channel is provided in the casing, and in particular through the casing. The generated target gas can escape from the compartment through the channel. Preferably, the channel is a break-through in the casing, and preferably is arranged in the base plate.

Alternatively to the channel, the target gas may leave the gas generator through leaky channels in the material of the casing in view of excess pressure in the compartment, in particular in case the target gas generation rate is desired to be very small.

In the embodiment of the present invention with the casing comprising a base plate (also referred to as socket) and a cap with a shell, electrical conductors may be embedded in or applied on the base plate for electrically contacting the heater structure. Pads or contacts may be provided on the base plate, and, specifically, on a side of the base plate facing the ambient. Such contacts enable to electrically contact the heater structure from the outside, e.g. from a control unit. The contacts can be embodied in various ways, e.g. by one of spring contacts, connectors, pins, etc.

Preferably, the channel is arranged in the base plate. In a preferred embodiment, a membrane covers the channel. Preferably, the membrane is permeable at least to the target gas. The membrane may protect the compartment and the active material from liquids and/or solid particles. It is preferred that the membrane is arranged on the side of the base plate facing the outside/ambient.

It is very preferred that the heater structure is arranged as to homogeneously, i.e. uniformly, heat the active material. In one example, the heater structure may enclose at least a part of the casing for doing so. In particular the heater structure encloses the compartment instead of being led into the compartment. This has at least three advantages:

First, the heater temperature necessary to heat the entire active material to a given temperature (e.g., 120° C.) is minimal for an external, homogeneous heater configuration, as opposed to an inside heater which is understood as heater structure led into the active material and in touch with the active material. The inside heater leads to a rather inhomogeneous temperature distribution across the active material, with variations in temperature of several degrees ° C. Such a configuration may also require a high heater temperature, e.g. above 200° C., to bring the active material furthest away from the heater structure to temperatures of −120° C. necessary for practical oxygen generation rates. In contrast, in the present embodiment a heater structure is employed that greatly increases the temperature homogeneity in the active material by heating it from the outside. As a result, the required heater temperature to bring the entire active material to a given target temperature is greatly reduced, e.g., a heater temperature of only 125° C. is needed to heat the active material to 120° C., e.g. for the generation of O2 from ZnO2 in one embodiment. The lower heater temperature of the present embodiment in turn represents a safety advantage, because it minimizes the risk for heating the active material above its critical temperature, which in turn may trigger a "thermal runaway", at which the heat generated by the oxygen generation reaction (exothermic) cannot be dissipated, leading to further increase of the temperature and hence a further acceleration of the oxygen generation that cannot be stopped, i.e. a spontaneous decomposition of the active material. This drawback becomes especially apparent towards the gas generator's end of life (EOL) when most of the active material is already consumed and higher temperature of the central wire are needed for the oxygen generation.

Second, the homogeneous heating achieved by such external heater configuration leads to a uniform decomposition of the active material. Uniform decomposition in turn requires little to no re-adjustments of the heater power across the lifetime of the gas generator to activate the entire active material. This reduces the complexity of a control loop configured to control the heater. Simple heater configurations instead, like a central, internal heater, hence, result in a non-homogeneous temperature distribution in the active material. To heat a constant volume of active material to a given target temperature, the input power for such a heater configuration must be adapted over the generator lifetime because the active material is gradually consumed. Besides the principal risk for a thermal runaway, such arrangement also requires a sophisticated heater control circuit including a state model of the gas generator. In the present embodiment, however, the homogeneous temperature distribution in the active material leads to a homogeneous consumption of the active material, which drastically reduces the need for heater power adaption across the gas generator lifetime, enabling a much simpler control circuit. A state model is not required in this configuration.

Third, the homogeneous heating achieved by such external heater enables to safely generate on-demand a small, controllable rate of the target gas, such as oxygen, e.g. 0.02-20 µmol/h over a period of several years, such as five years.

In embodiments of the present invention, the active material to be deposited in the compartment is one of $LiClO_4$, $LiClO_3$, $Ag_2O$, $Li_2O_2$, $NaClO_4$, $NaClO_3$, $KClO_4$, $KClO_3$, $Na_2O_2$, $K_2O_2$, $NaO_2$. The target gas is $O_2$ for all these compounds. Generally, generation of $O_2$ for these materials may even start at temperatures of and above 50° C., and especially between 50° C. and 100° C. In particular, $LiClO_4$ is decomposed into $LiCl+2O_2$ for preferred temperatures between 380° C. and 430° C. 2 $LiClO_3$ is decomposed into $2LiCl+3O_2$ for a preferred temperature of 270° C.+/−10%. $Ag_2O$ provides 2 mmol $O_2$/g at preferred temperatures of 200° C. or more. $Li_2O_2$ provides 0.1 mmol $O_2$/g at preferred temperatures of 340° C. or more.

In different embodiments, the target gas is one of $N_2O$, $N_2$, $CO_2$, or $SO_3$. In particular, $NH_4NO_3$ is decomposed into $2H_2O+N_2O$. 2 $NaN_3$ is decomposed into $2Na+3N_2$. $CaCO_3$ is decomposed into $CaO+CO_2$. $K_2S_2O_7$ is decomposed into $K_2SO_4+SO_3$.

In a different embodiment, the material is configured to generate the target gas by desorption in response to the thermal activation, i.e. by thermal desorption, preferably subsequent to a preceding adsorption. In such embodiment, the material may be $CeO_2$ delivering a target gas $O_2$ of 0.2 mmol $O_2$/g. The material may also comprise molecular sieves, e.g. zeolites, silica, glass, clay, etc., in particular for generating target gases other than $O_2$.

Preferably, the active material is mechanically compacted to minimize the size and/or volume of the gas generator. Preferably, the active material is compacted, i.e., granulated or powder material that is directly pressed into the casing. Pre-compressed material simplifies, or even enables, the compaction into the casing. For example, it could mechanically be impossible to press powder directly into the casing. Alternatively, the active material can be pressed into a tablet before being inserted into the casing. Tablets instead of a granulate can improve the handling of the active material. In particular, in case the active material comprises or is zinc peroxide powder, the active material is first granulated, and the granules then are pressed into the inner of the casing, i.e. the compartment.

In a preferred embodiment, a thermal insulation element at least partly encloses the casing. In case of a cylindrical casing with a base plate, the thermal insulation element may also be embodied as a cylindrical shell or cap, which is mounted onto the base plate.

In such scenario, it is preferred that a spacer is provided for separating at least parts of the casing from the thermal insulation element and to increase the mechanical stability of the shell or cap by supporting it on the insulation. The thermal insulation element increases the temperature homogeneity in the active material and the thermal efficiency of the gas generator. A spacer element, which sits on the distal end of the shell and mechanically connects the shell with the insulation increases the mechanical stability of the gas generator.

Instead of the thermal insulation element, a convection barrier may be used to suppress forced convection of the heated shell.

In various applications, a concentration of a target gas is to be maintained in a confined housing over time. However, without any additional efforts, the concentration of the target gas in the housing may drop over time even if the housing is confined gas-tight. Reasons for such drop in the target gas concentration may be due to a physical adsorption of the target gas on inside surfaces of walls defining the housing. In a different scenario, chemical reactions of the target gas with constituents of the inside of the walls defining the housing may be the reason for the gradual drop of the target gas concentration in the housing. And finally, even though the housing as such may be deployed as gas-tight, the target gas concentration may drop over long time scales due to diffusion processes or tiny leaks.

In some applications, the housing is configured to hold a gas mixture with the target gas being one of the gaseous components. Such gas mixture may be formed on purpose, or the gas mixture may include a different desired gas component with the target gas being a background gas. The problems of a drop in target gas concentration over time remain the same.

Accordingly, a device is proposed for holding a target gas, the device comprising a preferably gas-tight housing and a gas generator according to any of the above embodiments arranged inside the housing for releasing the target gas inside the housing. In addition, a reference sensor is provided sensitive to the target gas and arranged to supply a sensor signal representing a concentration of the target gas in the housing. A control unit is provided and configured to control the release of the target gas from the gas generator by way of the control signal, dependent on the sensor signal.

The device further comprises the gas generator that is configured and arranged to release the target gas in the compartment in response to a control signal. In particular, the gas generator is provided to compensate for a target gas loss during operation of the device and/or during life time of the device, and hence, is provided to release the target gas, and preferably to release a defined portion of the target gas upon request. For this controlled release of the target gas, the gas generator is controllable by the control signal, which control signal e.g. is generated by a different unit such as a control unit to be introduced below. Hence, the gas generator is an autonomous gas generator arranged in the housing.

The device further comprises a reference sensor sensitive to the target gas. Hence, the reference sensor preferably is a gas sensor that either directly or indirectly measures a concentration of the target gas inside the housing. For this reason, the reference sensor is arranged in the housing. The reference sensor supplies a sensor signal indicative of a concentration of the target gas in the housing, preferably of the actual target gas concentration. The sensor is denoted as reference sensor because its sensor signal preferably is used as a reference with respect to a desired target gas concentration in the housing.

The reference sensor preferably is embodied as a thermal gas sensor. Preferably, such thermal gas sensor involves converting thermal properties of the target gas concentration into an electrical signal i.e. the sensor signal. The thermal properties may include one or more of thermal diffusivity, thermal conductivity, and/or thermal capacity of the target gas. The thermal gas sensor preferably is embodied as a micro-thermal gas sensor including structures in the micro- or even in the nano-range. A thermal gas sensor or micro-thermal gas sensor is configured to measure the concentration of the target gas based on the thermal property of the target gas, in particular in comparison to different thermal properties of gases other than the target gas. Different gases show different thermal properties, in particular in one or more of different thermal conductivities, different specific thermal capacities, and/or different densities. Hence, a thermal gas analysis even allows the determination of a concentration of a target gas in a gas mixture. In one embodiment, an electrical heater, referred to as reference heater, is provided in the reference sensor for heating the gas in vicinity of the reference sensor, as well as at least one temperature sensor is arranged in the reference sensor distant from the heater. A thermal flow is evoked when activating the reference heater, which thermal flow is detected by the one or more temperature sensors, however, phase-shifted with respect to the heater activation signal and subject to the target gas. The phase-shift between the temperature signal and the heater activation signal and/or between the temperature signals is evaluated, in particular when the reference heater is activated with one of a pulsed signal or a sinus signal. In particular, the thermal conductivity a, in a thermal gas sensor with a sinus shaped heater activation and two temperature sensors arranged at different distances d1 and d2 from the reference heater is determined by:

$$a = \frac{\pi * f * (d2 - d1)^2}{\Delta\varphi^2}$$

with $\Delta\varphi$ being the phase shift between the two signals of the temperature sensors and f being the frequency of the sinus shape reference heater activation.

In a different embodiment, the thermal conductance is the relevant parameter, wherein with a pulsed heater activation signal with intervals between the pulses being sufficiently long, a stationary thermal field is generated in the compartment, wherein a thermal conductivity can be derived from the temperature signal, in particular from a voltage of a thermopile representing the temperature sensor, by way of e.g. a look-up-table. In a different embodiment, the reference sensor is a pressure sensor. For example, a partial pressure of the target gas is a measure for the concentration of the target gas in the compartment provided a partial pressure of a background gas resident in the compartment in addition to the target gas is constant.

Other sensing principles may be applied in the reference sensor: In different embodiments the reference sensor is an optical spectroscopy sensor, or an electrochemical sensor, or a metal-organic chemical sensor, or an impedometric sensor, or a MOX gas sensor.

The device further comprises a control unit configured to control the release of the target gas from the gas generator by way of the control signal, dependent on the sensor signal, and hence, dependent on the current concentration of the target gas inside the housing. Accordingly, input to the control unit is at least the sensor signal, and, preferably, as will be introduced below, a constant value, while the output of the control unit at least includes the control signal for controlling the gas generator. In one embodiment, the control unit is embodied as a feedback loop control, for controlling the target gas to the defined constant value, such that finally the compartment holds a desired target gas concentration over time represented by the constant value. In particular, the gas generator is activated by means of the control signal in response to the measured actual target gas concentration being lower than the desired target gas concentration represented by the constant value.

Other advantageous embodiments are listed in the dependent claims as well as in the description below.

BRIEF DESCRIPTION OF THE DRAWINGS

Embodiments of the invention will be better understood and objects other than those set forth above will become apparent from the following detailed description thereof. Such description makes reference to the annexed drawings, wherein.

MODES FOR CARRYING OUT THE INVENTION

Figure 1:
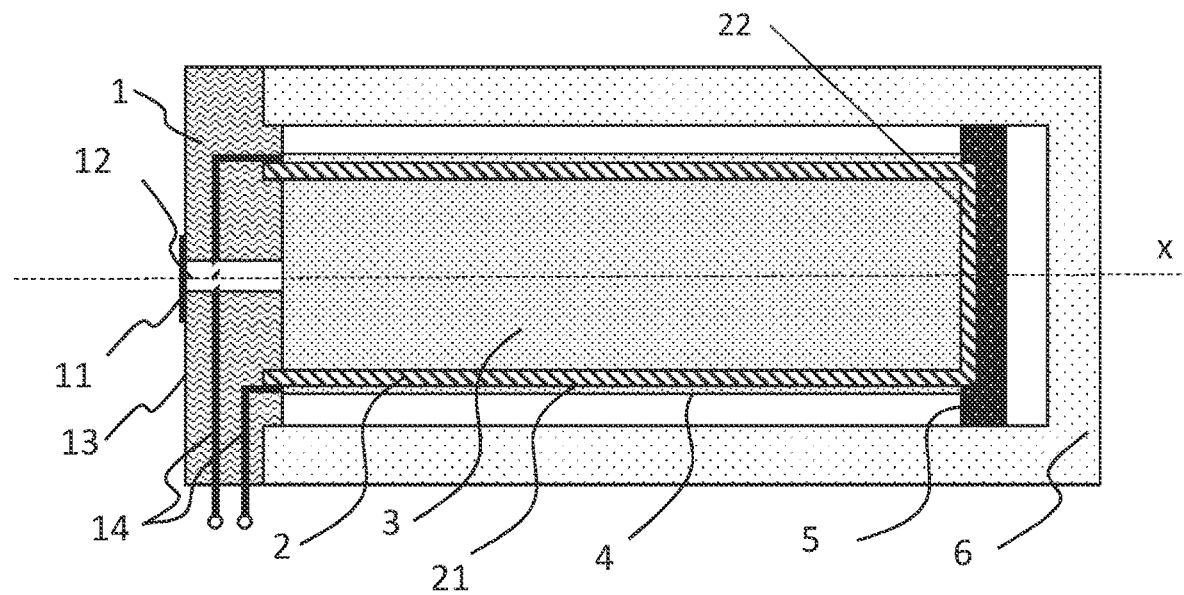
FIG. 1 illustrates a gas generator in cut view, according to an embodiment of the present invention.

FIG. 1 illustrates a gas generator in cut view, according to an embodiment of the present invention. A casing 1,2 comprises a base plate 1 and a cap 2 attached to the base plate 1. The cap 2 includes a shell 21 and a front end 22. In the present example, the casing 1,2 is of cylindrical shape. The casing 1,2 confines a compartment, i.e. an interior of the casing 1,2, also of cylindrical shape. Presently, the compartment is completely filled by an active material 3 that shall generate a target gas under the impact of heat.

Figure 3:
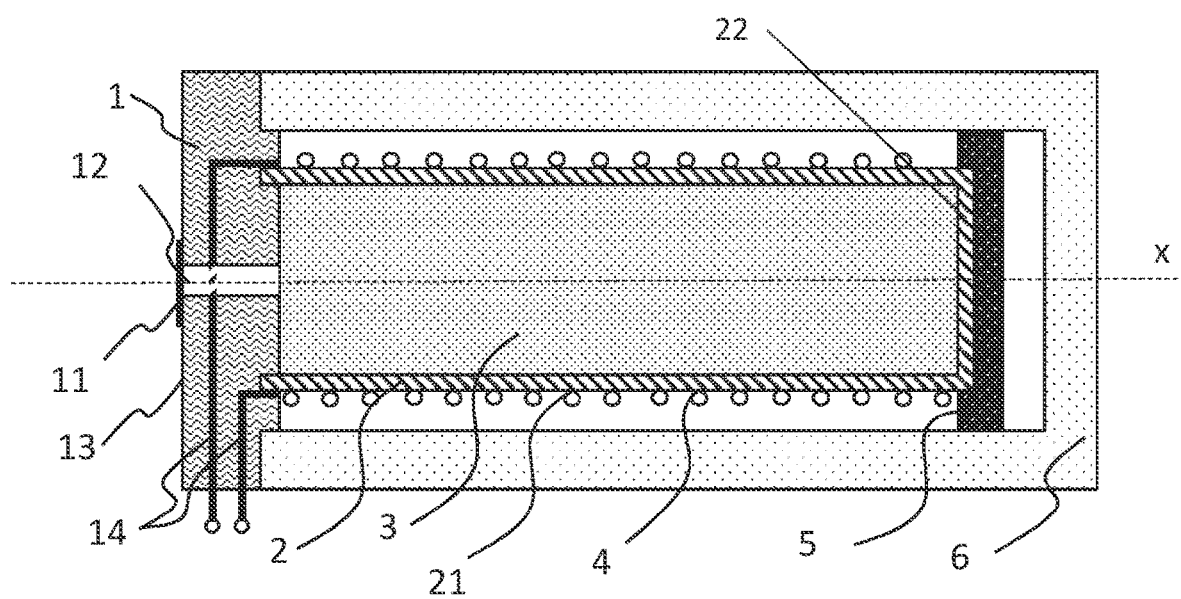
FIG. 3 illustrates a gas generator in cut view, according to another embodiment of the present invention.

In order to heat the active material 3 in the compartment, a heater structure 4 is provided on the outside of the cap 2. In particular, the heater structure 4 wraps around the shell 21 of the cap 2. In one embodiment, the heater structure 4 may be embodied on or in a foil wrapped around the shell 21. In another embodiment, the heater structure 4 is embodied as wire coil which is shown in FIG. 3. Other than the heater structure 4, the gas generator of FIG. 3 is identical to the gas generator of FIG. 1, and same elements are referred to by the same reference signs.

The active material 3 is separated from the heater structure 4 by way of the shell 21. However, the material of the shell 21 and, hence, the cap 2 is thermally conducting such that in response to heating the heater structure 4, the heat so generated applies to the active material 3 and, e.g. at a temperature of 120° C., triggers a reaction resulting in the release of the target gas.

The base plate 1 comprises a through channel 12 which provides a connection from the compartment to the outside of the gas generator. The target gas generated under the impact of heat can leave the compartment through the channel 12. At a side 13 of the base plate 1 facing the ambient, a membrane 11 is attached to the base plate 1. The membrane 11 is permeable at least for the target gas such that the target gas can diffuse through the membrane 11 on its way from the compartment to the outside. On the other hand, the membrane 11 prevents liquids and solid particles from entering the compartment.

The base plate 1 further supports electrical conductors 14 for connecting to the heater structure 4. These electrical conductors 14 may be embedded in the base plate 1, or may be printed on a surface of the base plate 1. The electrical conductors 14 may terminate in pads for e.g. connecting a control unit to, which preferably controls the operation of the heater structure 4 and hence the release of the target gas.

A thermal insulation element 6, again in form of a cylindrical cap, is attached to the base plate 1 and encloses the cap 2 and the heater structure 4. A spacer 5 is provided to hold the thermal insulation element 6 distant from the heater structure 4, and, therefore, prevent loss of thermal energy into the ambient.

Figure 2:
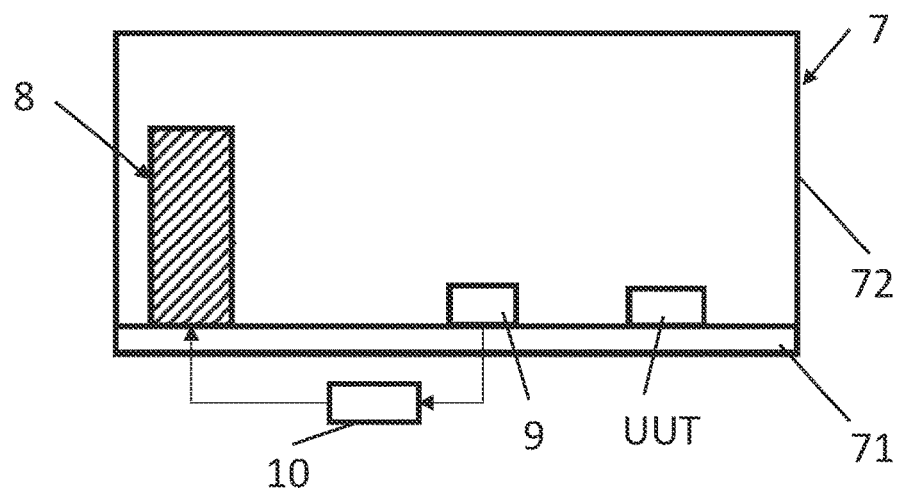
FIG. 2 illustrates a schematic cut view of a device for holding a target gas, according to an embodiment of the present invention.

FIG. 2 illustrates a device for holding a target gas according to an embodiment of the present invention. The device comprises a housing 7 defined by a gas-tight substrate 71 and a gas-tight top piece 72. The top piece 72 is attached to the substrate 71 by means of a gas-tight seal, such as an adhesive, not illustrated in FIG. 2. A gas generator 8, e.g. according to FIG. 1, is arranged on the substrate 71. The gas generator 8 comprises an active material emitting the target gas in response to thermal activation.

In addition, a reference sensor 9 is arranged on the substrate 71 in the housing 7. The reference sensor 9 is configured to sense a concentration of a target gas, such as $O_2$, in the housing 7. The reference sensor 9 is likewise electrically connected to conducting paths of the substrate 71. Further, a control unit 10 is provided outside of the housing 7 or inside the housing 7. The control unit 10 is configured to control the gas generator 8 by means of a control signal to achieve and maintain a target gas concentration in the housing 7 of a constant level, dependent on a sensor signal supplied from the reference sensor 9, both signals indicated by arrows. Hence, corresponding electrical connections (not shown) are provided to the gas generator 8 and the reference sensor 9.

A unit under test UUT preferably is arranged in the housing 7. The unit under test UUT desirably is exposed to the target gas at a preferably stable concentration over a desired time in order to evaluate an impact of the target gas on the unit under test UUT.

LIST OF REFERENCES 1,2 Casing
1 Base plate
11 Membrane
12 Channel
13 Side of base plate
14 Electrical conductors
2 Cap
21 Shell
22 Front end
3 Active material
4 Heater structure
5 Spacer
6 Thermal insulation element
7 Housing
8 Gas generator
9 Reference sensor
10 Control unit

The invention claimed is:
1. Gas generator, comprising
a compartment confined by a casing,
active material configured to generate a target gas in response to thermal activation,
a heater structure configured and arranged to heat the active material for generating the target gas,
wherein the active material is arranged in the compartment,
wherein the compartment has a volume of less than 0.5 cm$^3$,
wherein the active material is a compacted powder or a compacted granulate,
wherein the heater structure is arranged outside of the compartment,
wherein the heater structure is arranged to heat the active material from at least two sides,
wherein the casing comprises a base plate and a cap arranged on the base plate,
wherein electrical conductors in electrical contact with the heater structure are arranged in or on the base plate.
2. The gas generator of claim 1,
wherein the heater structure is out of contact with the active material,
wherein the heater structure is arranged outside the casing such that the heater structure is separated from the active material at least by the casing.
3. The gas generator of claim 2,
wherein the heater structure is in contact with the casing.
4. The gas generator of claim 1,
wherein the heater structure is integrated in the casing.

5. The gas generator of claim 1,
wherein the compartment has a longitudinal axis (x),
wherein the casing comprises a shell defined as portion of the casing extending along the longitudinal axis,
wherein the heater structure encloses the shell or is integrated into the shell, and is thereby configured to heat the active material in the compartment from four sides.

6. The gas generator of claim 5,
wherein the compartment is a cylinder.

7. The gas generator of claim 5,
wherein the shell is made from a thermally conducting material.

8. The gas generator of claim 5,
wherein the heater structure is in contact with the shell or is cast into the shell.

9. The gas generator of claim 1, comprising
a channel in the casing configured to release the generated target gas from the compartment.

10. The gas generator of claim 9,
wherein the channel is a channel through the base plate.

11. The gas generator of claim 9, comprising
a target gas permeable membrane covering the channel.

12. The gas generator of claim 11,
wherein the target gas permeable membrane is arranged on a side of the base plate facing the ambient.

13. The gas generator of claim 1,
wherein the heater structure is a resistive heater structure,
wherein the heater structure is arranged to uniformly heat the active material.

14. The gas generator of claim 1,
wherein the heater structure is arranged to heat the active material from four sides of the compartment,
wherein the compartment has the shape of one of a polyhedron, a cylinder, a cone or a sphere.

15. The gas generator of claim 5, comprising
a foil supporting the heater structure, which foil is wrapped around the shell.

16. The gas generator of claim 1,
wherein the active material is compacted in the compartment.

17. The gas generator of claim 1,
wherein the active material has the shape of a tablet.

18. The gas generator of claim 1,
wherein the active material comprises zinc peroxide.

19. The gas generator of claim 1, comprising
a thermal insulation element at least partly enclosing the casing, and
a spacer for separating at least parts of the casing from the thermal insulation element.

20. Device for holding a target gas, comprising
a housing,
a gas generator according to claim 1 arranged inside the housing to release the target gas inside the housing,
  a reference sensor sensitive to the target gas and arranged to supply a sensor signal representing a concentration of the target gas in the housing,
  a control unit configured to control the release of the target gas from the gas generator by way of the control signal, dependent on the sensor signal.

* * * * *